April 23, 1940. H. D. SIMPSON 2,197,882
CUFF LINK
Filed Feb. 20, 1939
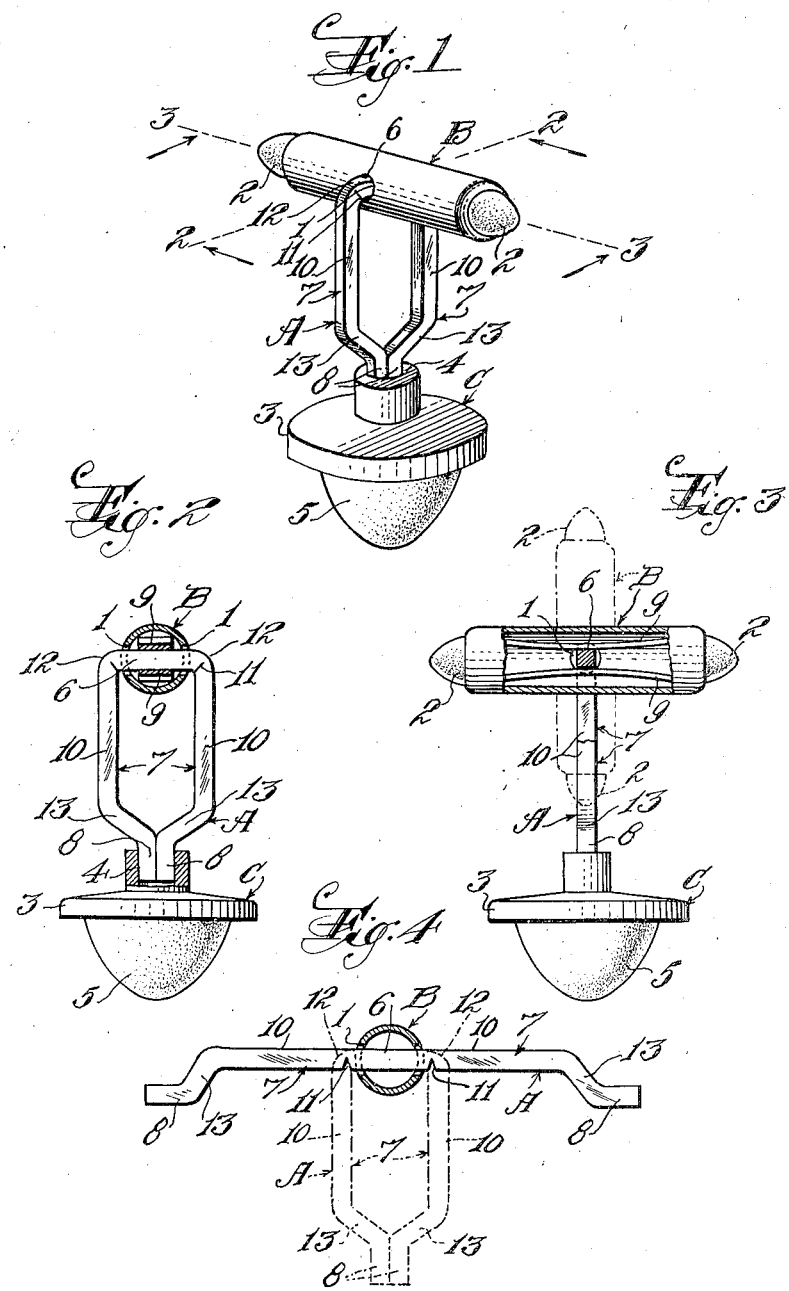
INVENTOR
Harrison D. Simpson,
BY
Harry B. Rook,
ATTORNEY Patented Apr. 23, 1940

2,197,882

UNITED STATES PATENT OFFICE 2,197,882

CUFF LINK

Harrison D. Simpson, Hillside, N. J., assignor to Krementz & Co., Newark, N. J., a corporation of New Jersey Application February 20, 1939, Serial No. 257,381

2 Claims. (Cl. 24—102)

This invention relates in general to sleeve buttons or cuff links of the type including a shank having a head rigidly mounted at one end and and an elongate or bar-like head pivotally mounted at the other end selectively to swing into substantial longitudinal alinement with the shank and perpendicular to the shank so that the pivoted head and shank first can be inserted in alinement with each other through a buttonhole and said pivoted head can then be swung perpendicularly to the shank to hold the latter against slipping out of the button-hole.

In cuff links of this general character the shank usually has been made of gold or gold-covered base-metal and U-shaped, and the base thereof has been secured to the rigid or fixed head, while the pivoted or movable head has been mounted between the arms of the U-shaped shank by a rivet or pin. Such a construction is expensive to manufacture requiring several pieces and several assembly operations, the rivets are unsightly, generally not being covered with gold or precious metal, the heads of the rivets frequently become roughened or project beyond the surfaces of the shank so as to catch on the edges of a button-hole, and the ends of the arms of the shank interfere with insertion of the shank through a button-hole. Moreover, due to the holes in the shank for the rivet, the arms of the shank must be made relatively thick or heavy. Generally the pivoted head has been a one-piece tube, circular or square in cross section, to receive springs to cooperate with the rivet for holding the head in adjusted positions, and great care has been necessary to avoid crushing or denting of the walls of the tubular head or bending of the rivet during upsetting or heading of the rivet.

A prime object of my invention is to provide a cuff link of the general character described which shall embody novel and improved features of construction and avoid all of the above-mentioned difficulties and disadvantages of the known cuff links.

Another object is to provide a simple and inexpensive cuff link that shall embody a novel and improved construction for connecting the heads of the link to the shank whereby rivets or pivot pins shall be eliminated, the link shall be light in weight, strong and durable, and the insertion of the link through a button-hole shall be facilitated.

Other objects, advantages and results of the invention will appear from the following description when read in conjunction with the accompanying drawing in which Figure 1 is a perspective view of a cuff link embodying my invention.

Figure 2 is a side elevational view of the cuff link with portions shown in section on the line 2—2 of Figure 1.

Figure 3 is a front elevational view of the link with portions shown in section on the line 3—3 of Figure 1, and Figure 4 is a view illustrating the manner of assembling the tubular head and the shank, showing the head in transverse section and the shank partially formed and in side elevation.

Specifically describing the invention, the cuff link is of generally known constrution including a shank A having a bar-like or elongate head B pivotally mounted at one end thereof and a second head C rigidly connected to the opposite end of the shank. As shown, the pivoted head B is preferably tubular and formed of one piece of thin metal, with transversely alined pivot openings 1 disposed intermediate the ends of the tube. The tube may be of any desirable cross-sectional shape, but preferably is circular, and the ends of the tube may carry suitable ornaments, for example colored stones 2 that are secured in the ends of the tube in any suitable manner.

The structure of the rigid head C may also be as desired, for example including a cup-shaped body 3 having a socket 4 at one side and a suitable ornament such as a colored stone 5 at the other side.

In accordance with the invention, the shank A is U-shaped or looped and formed of one piece of wire. The cross-sectional shape of the wire may be as desired, but preferably is square as shown. The shank has a base or intermediate portion 6 extending through the pivot openings 1 of the head, and arms 7 disposed approximately perpendicularly to the base portion at opposite sides of the head B and in juxtaposed spaced relation to each other in a common plane so that the ends of the head B may swing into a position between the arms 7 and in substantial longitudinal alinement with or in the plane of the shank. The free ends 8 of the arms 7 are rigidly fastened in the socket 4 of the rigid head C by swaging the walls of the socket tightly over them. Each arm preferably is of a length substantially less than twice the greater of the distances between the intermediate portion 6 and the respective ends of the head B, so that the shank shall be conveniently short and when the link is in use the arms will be located in a button-hole to restrain rotation of the link in the button-hole.

Within the tubular head B is a suitable known mechanism for holding the head selectively perpendicularly to the shank and in substantial longitudinal alinement with the shank, as shown in Figure 3. This mechanism is shown as comprising two spring strips 9 arranged within the tube and bowed inwardly toward each other so as to bear selectively against each of two angularly related flat sides of the polygonal base portion 6 of the shank.

An important feature of the invention is the pivotal attachment of the head B to the shank A. A preferred method of attaching the head to the shank is schematically illustrated in Figure 4 of the drawing wherein a piece of wire having a straight portion 10 is inserted endwise through the pivot openings 1 of the head and formed with miter notches 11 spaced apart a distance slightly greater than the exterior diameter of the head B and preferably equidistantly spaced from the ends of the piece of wire. After insertion of the wire through the openings 1 of the head as shown in Figure 4, the wire is bent at the notches 11 as shown by dot and dash lines, whereby the notches are closed and become substantially invisible. This method of assembly permits easy bending of the wire and insures against crushing of the walls of the tubular head B or distorting the shape of the pivot which must be kept straight. It also provides a strong integral connection of the pivotal portion 6 of the shank and the arms 7 of the shank, with smoothly rounded corners 12 at the juncture of the arms and pivotal or base portion. The notches may be formed either before or after the wire is inserted through the openings 1 of the head B, and if desired one end portion of the wire may be bent before the wire is inserted into the head. Preferably after the wire has been inserted into the head, the free ends of the piece of wire are offset at 13 so as to abut each other when the wire is bent to form the arms 7 of the shank. The offset portions 13 are then rigidly secured to the head C.

It will be observed that a cuff link constructed in accordance with the invention provides a strong and durable pivotal connection of the elongate head B with the shank, all rivets, pivot pins and the like being eliminated. Piercing of the shank to receive rivets or the like is avoided, and consequently the shank may be made lighter in weight than is possible where rivets are required. This is especially important when the link is made of gold or other expensive metals. The round corners 12 at the juncture of the arms and the pivoted portion of the shank facilitate insertion of the link through a button-hole, eliminating the angular corners that are unavoidable in known riveted constructions. There are no rivet heads to protrude and catch in the edges of a button-hole, as in known constructions, and due to the absence of rivets, it is possible to have all exposed metal surfaces of the link formed of precious metal or plated or covered with precious metal. The ends of the wire shank are entirely concealed and covered, and are firmly held together, so that the structure of the link is strong and durable. Furthermore, the method of fastening the shank to the rigid head by swaging avoids the use of solder and consequent annealing, softening and discoloration.

Having thus described my invention, what I claim is:

1. In a cuff link, a head including a hollow elongate body having openings in its walls intermediate its ends alined transversely of the head, a shank comprising a single piece of wire having an intermediate portion polygonal in cross-section extending through said openings to form a pivot for said head and end portions right-angularly disposed to said intermediate portion in juxtaposed relation to each other substantially in a common plane and one at each side of said head, spring means within said head for engaging selectively each of two angularly related sides of said intermediate portion for releasably locking said head in either of two positions, a second head secured to said end portions of said piece of wire, the distance between said second head and said intermediate portion being substantially less than twice the greater of the distances of said intermediate portion from the ends of said head, and said end portions being rigid and in spaced relation to each other between said intermediate portion and said second head to provide clearance for pivotal movement of the first-mentioned head free from contact with said end portions.

2. In a cuff link, a head including a one-piece elongate tube having openings in its walls intermediate its ends alined transversely of the head and closures for the ends of said tube, a shank comprising a single piece of wire having an intermediate portion rectangular in cross-section extending through said openings to form a pivot for said head and end portions right-angularly disposed to said intermediate portion in juxtaposed relation to each other substantially in a common plane and one at each side of said head of a length substantially less than twice the greater distance of said intermediate pivot portion from the respective ends of said head, spring means within said tube for engaging selectively each of two angularly related sides of said rectangular intermediate portion for releasably locking said head either in the plane with said shank or at right angles thereto, and a second head secured to the extremities of said end portions of said piece of wire, said end portions being rigid and in spaced relation to each other substantially throughout the distance between said intermediate portion and said second head and permitting pivotal movement of the first-mentioned head free from contact with said end portions.

HARRISON D. SIMPSON.